United States Patent [19]
Lappington et al.

[11] Patent Number: 5,343,239
[45] Date of Patent: Aug. 30, 1994

[54] TRANSACTION BASED INTERACTIVE TELEVISION SYSTEM

[75] Inventors: John P. Lappington, Lawrenceville, Ga.; Susan K. Marshall, Greenwood Village, Colo.

[73] Assignee: Zing Systems, L.P., Englewood, Colo.

[21] Appl. No.: 796,085

[22] Filed: Nov. 20, 1991

[51] Int. Cl.$^5$ ............ H04H 1/00; H04N 7/087; H04N 7/14

[52] U.S. Cl. .................. 348/12; 348/13; 348/478; 455/4.2; 455/5.1; 455/6.3

[58] Field of Search ............ 455/4.1, 4.2, 5.1, 6.1, 455/6.2, 2; 358/142, 143, 145, 147, 86; 379/96; 273/439, 850, 85; 348/17, 478, 12, 13, 10

[56] References Cited

U.S. PATENT DOCUMENTS

| | | | |
|---|---|---|---|
| 4,572,509 | 2/1986 | Sitrick | 273/85 |
| 4,592,546 | 6/1986 | Fascenda et al. | 379/96 |
| 4,652,998 | 3/1987 | Koza et al. | 364/412 |
| 4,847,698 | 7/1989 | Freeman | 358/86 |
| 4,977,455 | 12/1990 | Young | 358/86 |
| 5,013,038 | 5/1991 | Luxenberg et al. | 273/439 |
| 5,083,800 | 1/1992 | Lockton | 273/439 |
| 5,093,718 | 3/1992 | Hoarty et al. | 358/86 |
| 5,093,921 | 3/1992 | Bevens, Jr. | 358/86 |
| 5,120,076 | 6/1992 | Luxenberg et al. | 358/84 |

Primary Examiner—Reinhard J. Eisenzopf
Assistant Examiner—Lisa Charouel
Attorney, Agent, or Firm—Fliesler, Dubb, Meyer & Lovejoy

[57] ABSTRACT

An interactive television system where interactive information is inserted in the vertical blanking interval of a standard television signal. The signal is received and decoded by a stetop decoder which sends the decoded signal via an infrared signal to a handheld device. The viewer using the handheld device can interact with a game, sports, or education event or other presentation on the television. The system includes a proprietary high level command language and programmer (PIU) tables which are maintained in the memory of the handheld device. The PIU tables store the transactions of the various events presented on the television. The transactions are sent from the insertion system to the decoder throughout the broadcast of the television program. Thus, for a sports event with interleaved commercials, one or more of the PIU tables would be used to store a collection of transactions used for the main event and one or more additional PIU tables are used for storing transactions for each of the interleaved commercials. This system allows a viewer to enter and exit any event at any time wit hot having to wait for information to be downloaded and without losing any scores. Further, the system allows the user to change from event to event such as, for example, by tuning to different stations and be able to immediately interact and have responses scored and stored.

60 Claims, 12 Drawing Sheets

FIG.-10 INFRARED (IR) COVERAGE AREA

TRANSACTION BASED INTERACTIVE TELEVISION SYSTEM

LIMITED COPYRIGHT WAIVER

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 1991 Watch and Win

FIELD OF THE INVENTION

The present invention is directed to an interactive communication system and in particular, one adapted for use with existing broadcast, cable, and satellite television or radio or other communication systems for allowing participants and viewers to interact with the system in order, by way of example only, to shop, enter into games of skill, and engage in educational presentations and other events where information is provided and the participant or viewer can make an appropriate response thereto.

BACKGROUND OF THE INVENTION

Many products have been introduced that provide the capability for the viewer to participate in television programs. These products accept cue signals transmitted to handheld devices that measure and control the response of the viewers as the viewers participate in the program. Some of these devices implement hardware that monitors the response or the results of responses accumulated over time and reports the results to a central site. One of the early embodiments of this technology was the QUBE interactive two-way television system introduced by Warner Communications at least as early as 1982. Other systems include the INDAX system field tested at least as early as 1984 by Cox Communications, and the Interactive Networks System field tested during 1990 and 1991.

The Interactive Network System is at least in part described in U.S. Pat. No. 4,592,546 which is entitled "GAME OF SKILL PLAYABLE BY A REMOTE PARTICIPANTS IN CONJUNCTION WITH A LIVE EVENT" and issued on Jun. 3, 1986. This system, in one embodiment, contemplates the use of the vertical blanking interval of the standard NTSC television signal for downloading to a remote viewer's handheld device game play or other interactive instructions. In addition over the vertical blanking interval (VBI) a lock-out signal can be sent to prevent scores from being credited after the answer to the event has been presented on the screen. This system demonstrates the capability of having the scores accumulate throughout the television presentation, then allows the final scores to be burst back as, for example, digital data over a modem after the program is completed and during a time interval which is significantly less than the total time interval of the program.

All of the above products fall generally within one of two categories of product. The first category consists of software that is coded in firmware in a remote participant's handheld device where the participant can start playing along with the interactive program as soon as the programs begins. The second category maintains the software in random access memory in the viewer's handheld device where the program must be downloaded into the device prior to the event starting. This process may require up to five minutes requiring the participant to wait prior to participating in the interactive program.

Both categories of devices are designed to work with one interactive program at a time, where the participant must complete that program before being able to participate in a new program.

When these products are compared to the television viewing habits of consumers, significant deficiencies are apparent. Most viewers do not continuously watch one program. Viewers generally switch between several channels. This is so pervasive in the industry that the term "grazing" has been given to the habit of switching between channels during the programs.

SUMMARY OF THE INVENTION

An interactive system concept that is compatible with the participants viewing habits is required for interactive television to be successful. This system must include the ability to maintain several interactive programs active at the same time and not require advance downloading of programs or initialization information. When the viewer tunes the channel, the viewer is immediately able to participate in the interactive program either if the viewer is for the first time watching that program or the viewer is returning after watching some other program for a brief or extended period.

In the situation where a viewer returns to a program that was previously watched, the interactive game continues, leaving out only the part that was missed. Any cumulative score for the part of the event actually participated in can be entered. The result would be the same as if the missed questions were not answered.

The present invention is designed to overcome the problems and disadvantages associated with the prior art and to address the way participants actually view television events. In particular, the present invention provides for a transaction based system whereby the various interactions, which can occur over a period time, between the system and the viewer, can be broken down into and defined by a plurality of transactions. The transactions are stored in programmer (PIU) tables which are identified by programmer identification (PID) numbers and which are provided in non-volatile memory in, for an example, a handheld device used by the viewer to interact with the television presentation. Data to update and reprogram each of the tables is supplied, in a preferred embodiment, over the vertical blanking interval in conjunction with the television presentation. Once the structure of the PIU table is established, the game can then be initiated through a high level command language which is sent over and incorporated in succeeding VBI lines in order to initiate the various transactions.

With a transaction based system, multiple games and interactions dealing with different subject matter can be accomplished in an interleaved manner. For example, during an hour long television presentation, a number of transactions can be strung together in order to interact with a continuous theme being presented in the main programming for that hour. Additionally, should the main programming be broken down into sections, the transactions can be grouped in as many groupings as necessary in order to represent the desired interactivity with each portion of the main program. Still in addition, the present system has the capability of allowing, for example, a transaction or grouping of transactions to take place for each of the multiple commercials which are spread throughout the main presentation. Thus, the present system affords the ability for the viewer to play and interact with multiple transactions which can be associated with totally different interactive presentations on the screen and have all of the interactions properly recorded and scored. As each of PIU tables can be established through the use of only a few VBI lines, the system allows a viewer to begin playing a game or interacting with the television presentation during any portion of the presentation and also allows the viewer to switch channels or "graze" and still be immediately able to play or interact with any game or presentation presently presented on the newest selected channel.

This ability presents a significant advantage over the prior art which requires, as indicated above, that the viewer pretune to a specific channel ahead of the game so that the necessary game software can be downloaded, over a significant interval of time, into the remote terminal before the game can be commenced. Further, such prior devices only afford the viewer the ability to play or interact with a single game or main event at a time without the ability to switch between events interleaved on the same channel, as for example, between the main event and commercials, or to switch to other channels and be able to interact with the event of that channel and have the results scored. Such grazing would not be available with prior devices due to the fact that a remote terminal would not have been properly programmed. In fact, should the viewer change channels, with prior devices the viewer would then not be able to interact with the event on that channel until the next event began or would have to wait for the software for that particular event to be downloaded before commencing with the interactivity.

Accordingly, the present invention provides for an interactive presentation system which comprises a device for receiving at a remote location interactive data in association with the presentation of an event. The interactive presentation system further includes a device for defining transaction structures for allowing the interactive active data to be communicated only as needed for each particular aspect of an event, and throughout the event such that there is no interruption of the event. Further, the transaction structures allow for events and aspects within each event to be interleaved while maintaining interactivity with each event. The system further includes a device for reporting the results of the interactivity.

The receiver mechanism of the present invention also includes a settop decoder for decoding interactive data received in conjunction with a signal of the event. The receiver device additionally includes a handheld terminal for allowing the user to interact with the event and a mechanism for providing communication between the settop decoder and the handheld terminal.

In another aspect of the invention, the transaction structure includes a device for storing identification for each of the plurality of transaction tables and a device for storing at least a portion of the interactive data and a user response to the interactive data.

In another aspect of the invention, the interactive data includes interactive commands, and also event specific data associated with each specific event or aspect of each event.

In yet another aspect of the invention, the receiving device includes a message display and the interactive commands cause messages to be displayed on the message display.

Yet in a further aspect of the invention, the receiving device can receive messages to be displayed and the transaction structure can store received messages. The interactive commands are for additionally causing either a received message or a stored message to be displayed in order to initiate or to continue with an interactive presentation.

Thus, with the present invention, the viewer is afforded the ability of interacting with a multiplicity of interleaved events, the ability to stop and start the interactivity at the viewers time of chosing, the ability to select events offered on a multiplicity of channels and to interact within a time period and in the order desired by the viewer and to have all of the responses for the various events scored and stored for the portion participated in by the viewer.

DETAILED DESCRIPTION OF THE PREFERRED EMBODIMENT

TRANSACTION BASED INTERACTIVE SYSTEM

Figure 1:
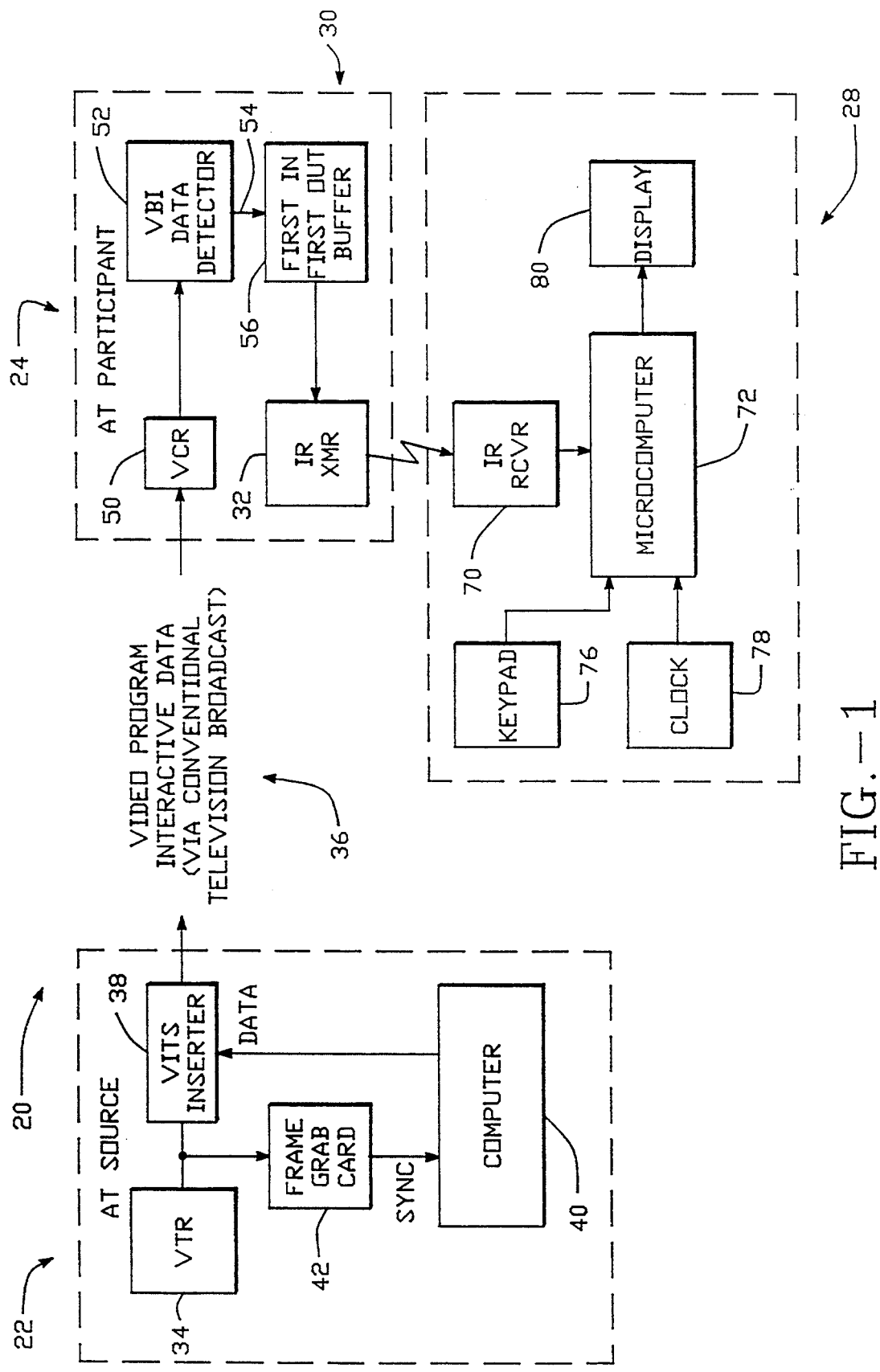
FIG. 1 depicts a schematical representation of an embodiment of the inserting system and the decoding system of an embodiment of the transaction based interactive television system of the invention

An interactive system 20 (FIG. 1) of the invention that includes the capability of allowing the viewer to participate with interactive television programs on many channels is best implemented by transmitting the interactive control information along with the television program.

One of the recognized approaches to transmit data in conjunction with a television video signals is to insert the data in lines 10 through 20 of the vertical blanking interval (VBI). An example of this method of transmitting data is closed captioning information which inserts data on line 21 of the VBI.

The system 20 has the data inserted with an insertion system 22 on the VBI of the program material prior to broadcasts and decoded with a decoding system 24 for the participant watching the program. At each receiving location 26, the data must be recovered from the VBI by the decoding system 24 which includes a decoder 30 and a handheld device 28, with the decoder 30 transmitting data to the handheld device 28 which is required to be used in order to participate in the interactive event.

Marketing considerations dictate that the settop data converter or decoder 30 decodes the VBI information and transmits the interactive data via an infrared transmission device 32 to the handheld device 28. Using IR transmission, the participant may move freely about the room keeping the handheld device 28 pointed in the general direction of the settop data converter 30.

The video tape recorder 34 of the insertion system 22 is used to play the source program of interest. This program may be a live event, and in that situation, a camera is substituted for the tape recorder. The output of the tape recorder 34 is a NTSC video and sound signal which can be transmitted through a video delivery system such as a cable or conventional television broadcast system 36 to a multiple of remote locations, for example, homes.

Figure 2:
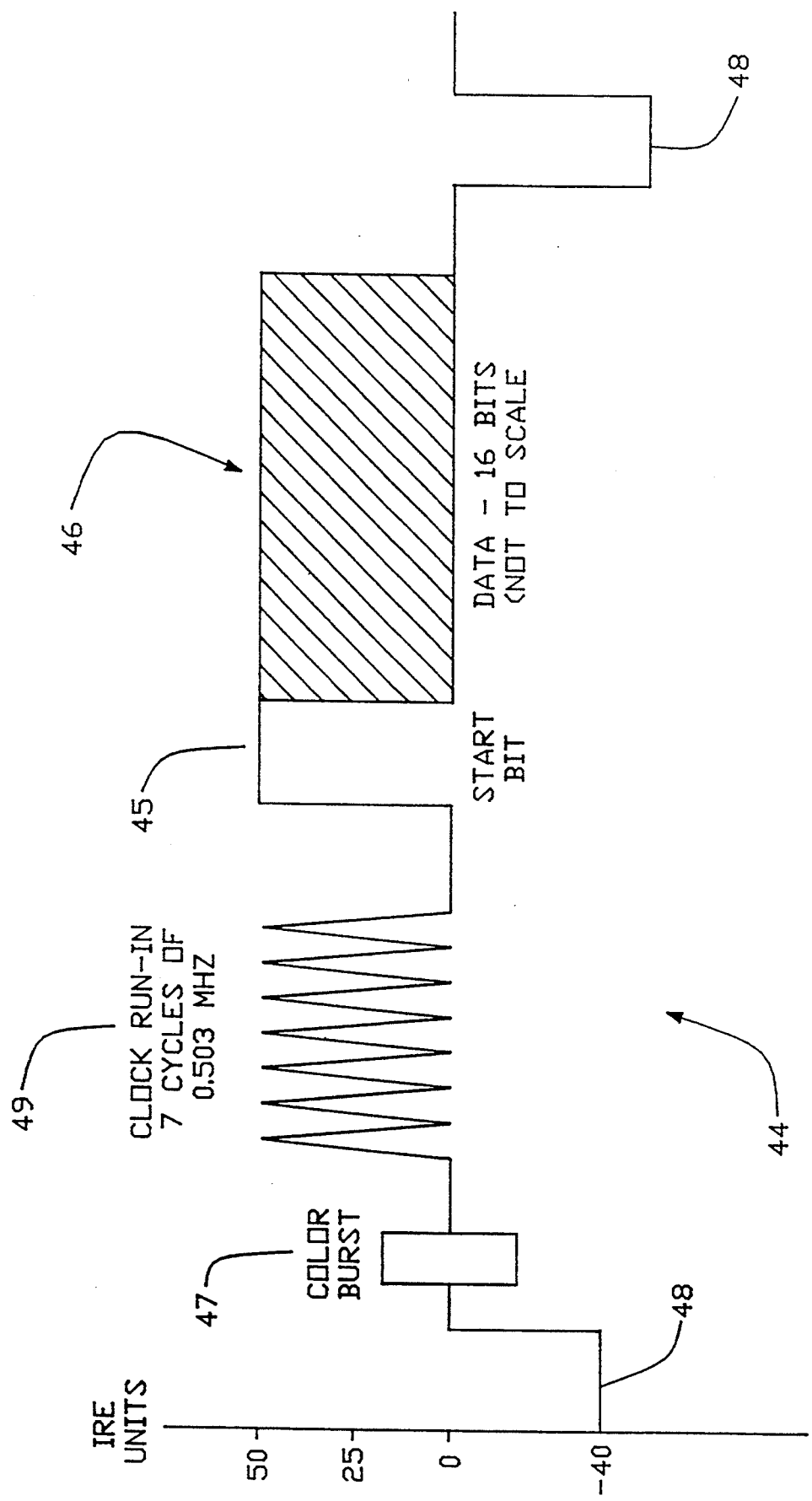
FIG. 2 depicts the format of a line of data in the vertical blanking interval.

The NTSC video output signal is supplied to a standard data bridge luminance inserter 38 which includes the capability to insert luminance modulated data on horizontal blanking interval lines within the vertical blanking interval. The interactive data to be inserted is provided by a computer 40 which synchronizes this data using a conventional frame grabber card 42 providing hardware interrupts for the vertical and horizontal blanking intervals of the program material from the VTR 34. The format of a horizontal line 44 of data is shown in FIG. 2.

One format for data transmitted within the VBI that is both well documented and is considered to be reliable is the format chosen for closed captioning information. This format transmits a burst of data 46, preceded by a start bit 45, driving one line of the VBI and located between synchronization pulse 48. A color burst signal 47 and a clock run-in signal 49 are also depicted. Each burst is repeated at the television field rate of 16.67 milliseconds FIG. 3. This data format provides for 14-bits of data with a parity bit every seven bits.

Any conventional data format is acceptable with the understanding that the data may be inserted on blank lines within the vertical blanking interval. The output signal from the luminance or VITS inserter 38 is transmitted over any conventional television distribution system including a broadcast, satellite or cable delivery system. The individual television channel carrying the program is selected using a conventional TV tuner as found in a television or consumer VCR 50. If a VCR is used as the tuner, the VCR contains a demodulator to provide a baseband video output containing the video of the program from VTR 34 and the interactive data inserted by the luminance or VITS inserter 38.

The video signal is processed using, for example, a conventional VBI data removal circuit 52 to create a data stream 54 identical to the inserted interaction data stream.

For reliable transmission using infrared as a transmission system, the data rate in a preferred embodiment does not exceed 3,000-bits per second. The VBI data is recovered at a data rate of 500,000-bits per second. However, this rate occurs for a short burst during the vertical blanking interval. Thus, while active video is being transmitted, interactive data is recovered from the program source.

Settop Decoder or Converter 30

The purpose of the settop converter 30 is to recover the data transmitted during the VBI at a high data rate and, using infrared, transmit that same information to the handheld device 28 at a much slower data rate of 3,000-bits per second. This can be solved using a first-in-first-out buffer 56 with different clocks for the input and output functions.

Figure 3:
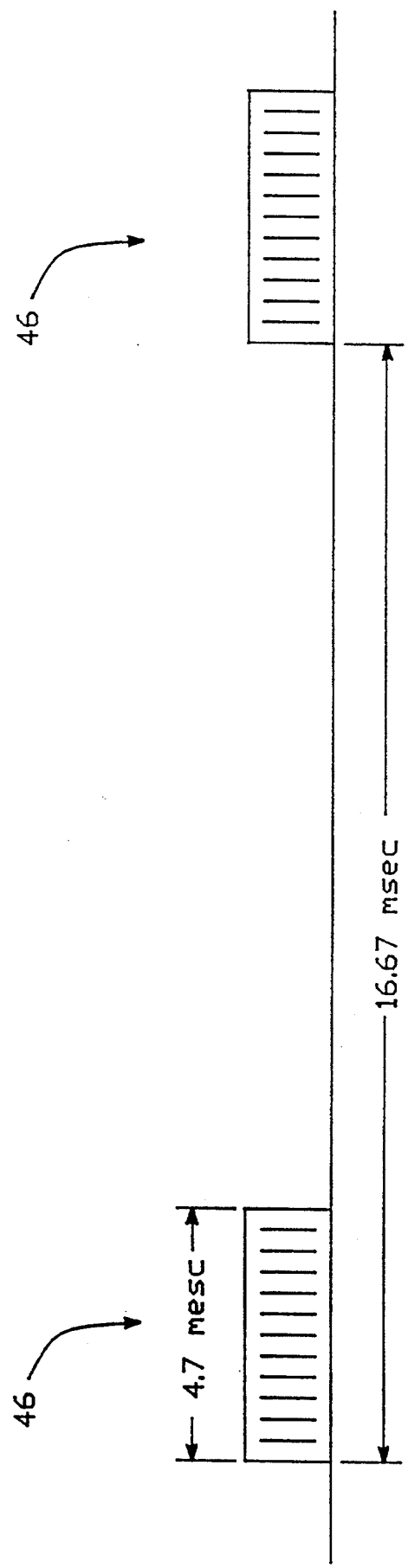
FIG. 3 depicts the data spacing for the data of FIG. 2.

The serial data stream is stored in the first-in-first-out buffer 56. Each group of 14-bits of data from a horizontal line 44 in the VBI is stored at the transmitted data rate of 500,000-bits per second. Since a specific horizontal line only occurs every 16.7 milliseconds, the data stream consists of 14-bits clocked at a high rate followed by 16.7 milliseconds of no data as shown in FIG. 3.

The output of the first-in-first-out buffer 56 is clocked at a data bit rate of 3,000-bits per second. Using this rate, the 14-bits are transmitted within 4.7 milliseconds as shown in FIG. 3.

The slower output rate from the first-in-first-out buffer 56 is necessary to insure that the output bit time is compatible with transmitting the data using an infrared modulator.

The infrared modulator or transmitter 32 consists of two oscillators running at a multiple of 3,000 Hz, with each phase locked to the output clock rate. If the bit from the buffer is a "1", the first oscillator is selected to drive the IR transmitter. If the bit is a "0", the second oscillator is selected to drive the IR transmitter. Using this FSK encoded data stream approach (FIG. 4), the IR transmitter radiates IR energy at a frequency determined by the serial data clocked out of the first-in-first-out buffer.

Thus from the above, it is evident that the interactive system includes a device for delivering one way low speed digital data to a handheld device that can be used to participate in interactive television programs.

Figure 5:
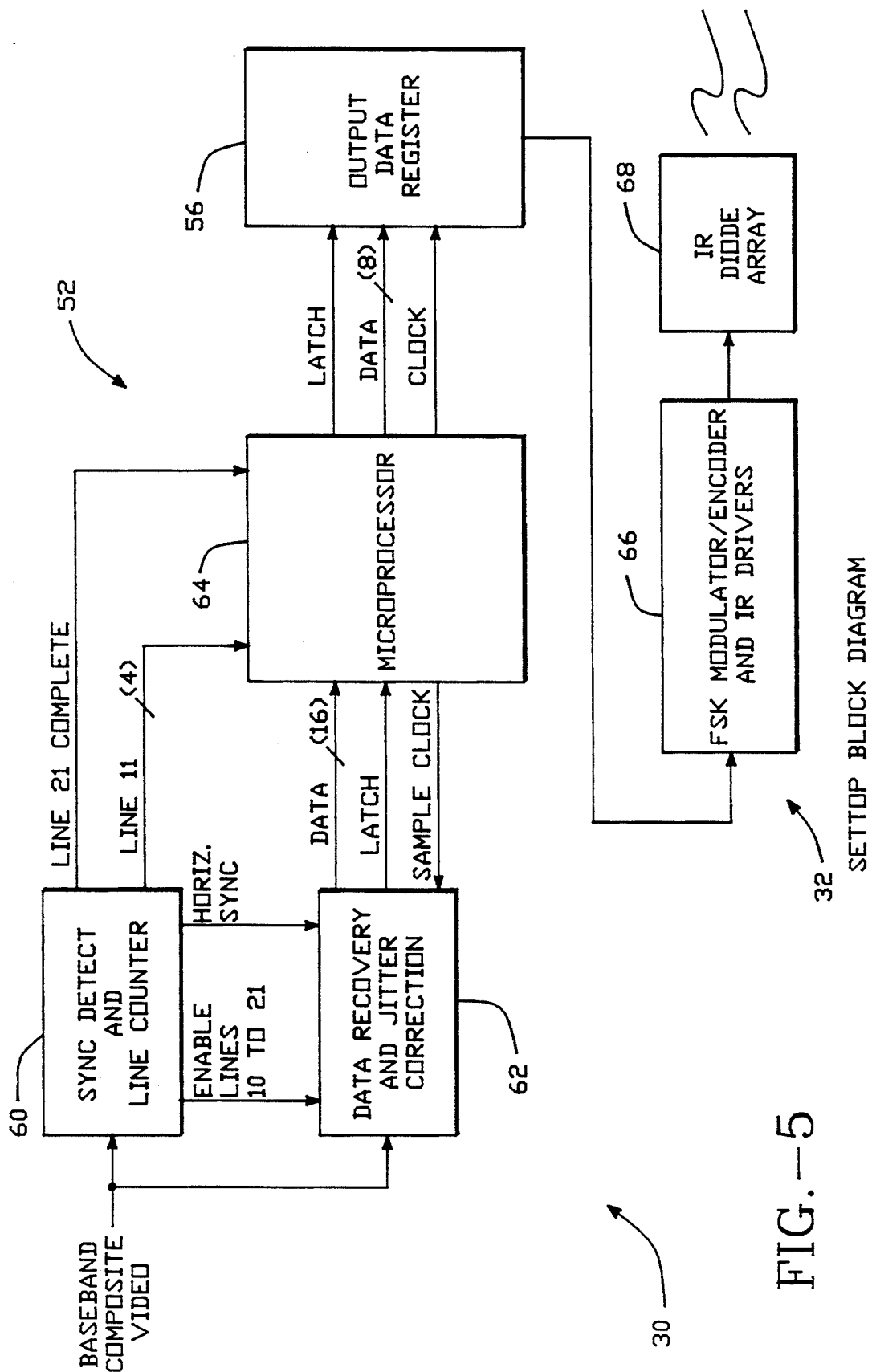
FIG. 5 depicts a more detailed schematical representation of the settop decoder of FIG. 1.

FIG. 5 depicts a more detailed schematical representation of the settop decoder 30 of the system as shown in FIG. 1. This settop decoder 30 is substantially similar to a conventional decoder for decoding VBI information used, for example, for closed caption applications. Additionally settop decoder 30 includes the IR modulator or transmitter 32 as described above. Viewing FIG. 5, it can be seen that the settop decoder 30 includes a synchronization detector and line counter 60 which receives the broadcast signal. Further, the settop decoder 30 includes a data recovery and jitter correction unit 62. These units 60, 62 communicate with the microprocessor 64 for causing the microprocessor 64 to latch VBI data to the register or first-in-first-out buffer 56. From buffer 56, the data is communicated to the FSK modulator and IR drive 66 and therefrom to the IR diode array 68. The FSK modulator and IR driver 66 and the IR diode array 68 comprise the IR transmitter 32.

Handheld Device or Terminal 28

Figure 6:
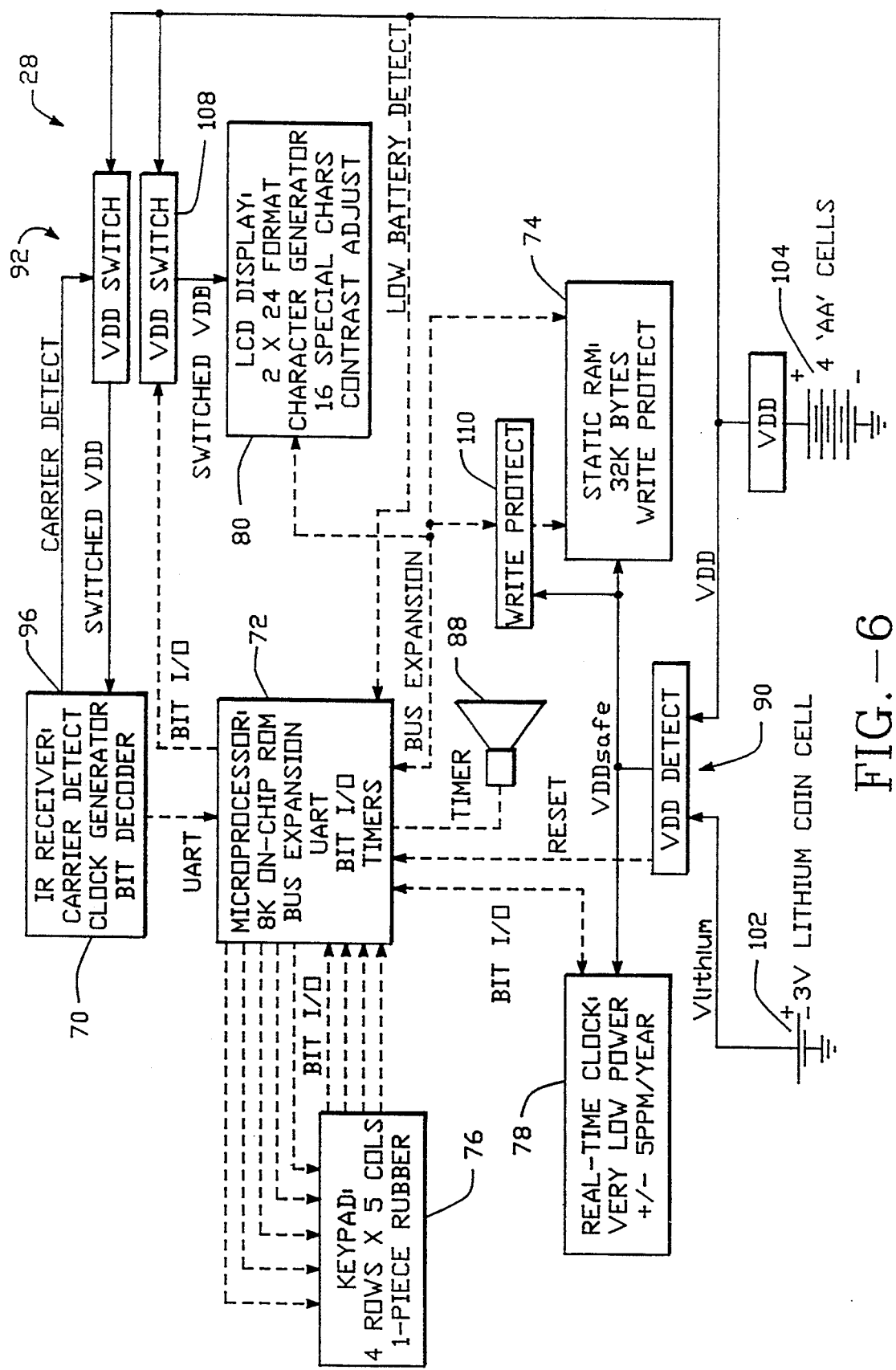
FIG. 6 depicts a more detailed schematic representation of the handheld device or terminal of FIG. 1.

The handheld interactive terminal 28 depicted in FIG. 6, provides the means to participate in the interactive program. It decodes the data stream from the settop converter 30 and implements the interactive program.

The hardware modules within the handheld device 28 consist of an infrared photo detector 70 to sense the IR signal from the settop converter 30, a microprocessor 72 with a control program, which can implement the command code discussed below stored in an on-board ROM, a RAM 74 including both non-volatile and temporary storage for information sent via the IR link, a keyboard 76 for data entry, a clock circuit 78 to track actual time, and a LCD display 80. A block diagram of the handheld device is shown FIGS. 1 and 6.

Figure 7:
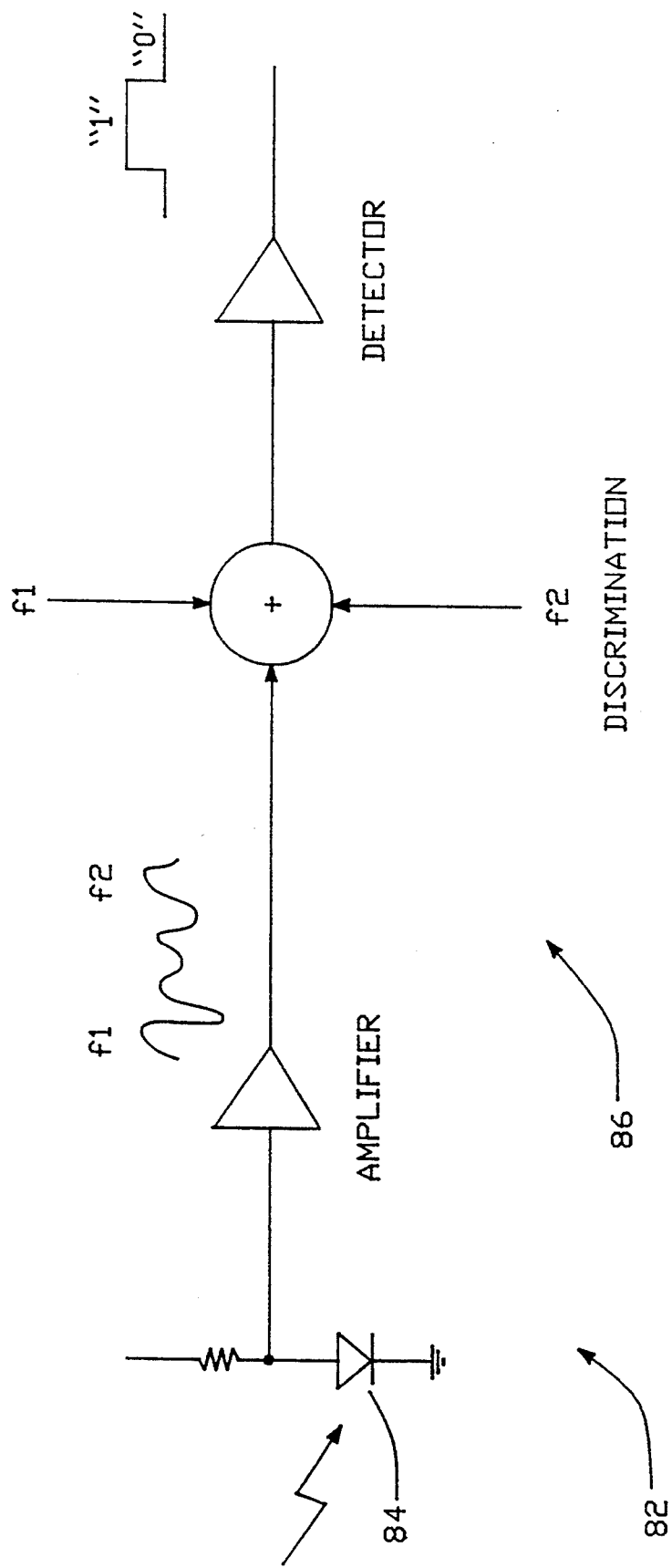
FIG. 7 depicts a schematical representation of the IR detector of the handheld device of the receiver of the system.

The IR receiver or detector 70 has a circuit 82 which consists of a photo diode 84 providing an electrical voltage proportional to the IR light level and a frequency discriminator 86 detecting the FSK modulation of the IR signal (FIG. 7).

The output of the photo detector 84 is amplified and shaped to provide a square wave with the frequency identical to the frequency of the IR signal. This frequency modulated signal is supplied to the frequency discriminator 86 tuned to the two frequencies used to transmit the IR data. This discriminator 86 recovers the serial data and supplies it to the microprocessor 72 of the handheld device 28.

The microprocessor 72 monitors the serial data transmitted via the IR link and builds a command stream from this data as defined in the below section describing the software structure of the invention. The commands create an operating program that implements an interactive program for the participant. The ROM of the microprocessor 72 contains the control program and command interpreter for the commands sent on the VBI. The RAM memory 74 stores the data and commands transmitted over the IR link representing the interactive program.

Figure 8:
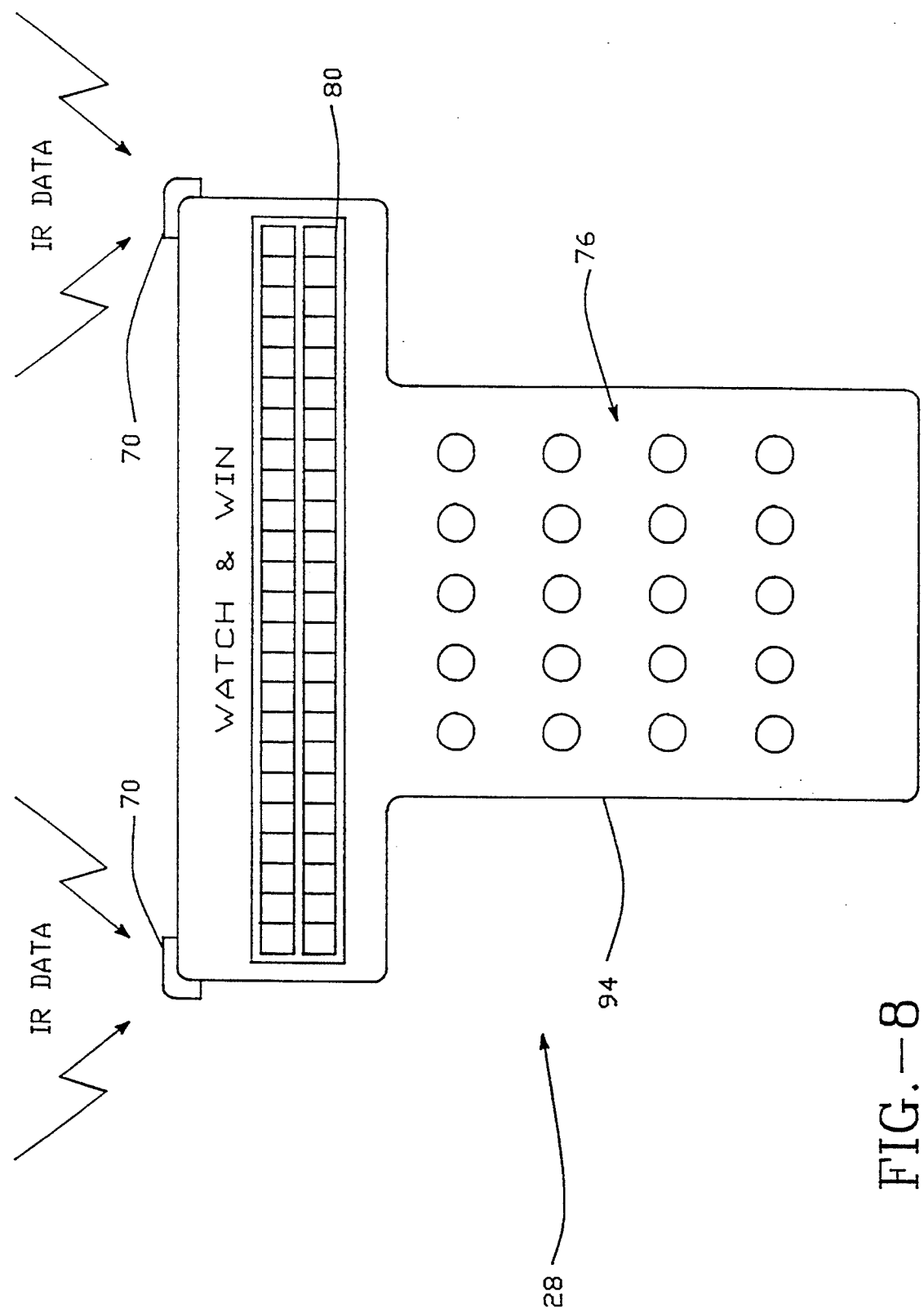
FIG. 8 depicts a top plan view of a "T" shaped handheld device of an embodiment of the invention of FIG. 1.

FIG. 8 shows an example for the "T" shaped case for the handheld device 28. Aspects of the outer housing 94 of the handheld device 28 include the following.

The case 94 is made from molded plastic of a strength and texture suitable for use by consumers in a household environment.

Figure 9:
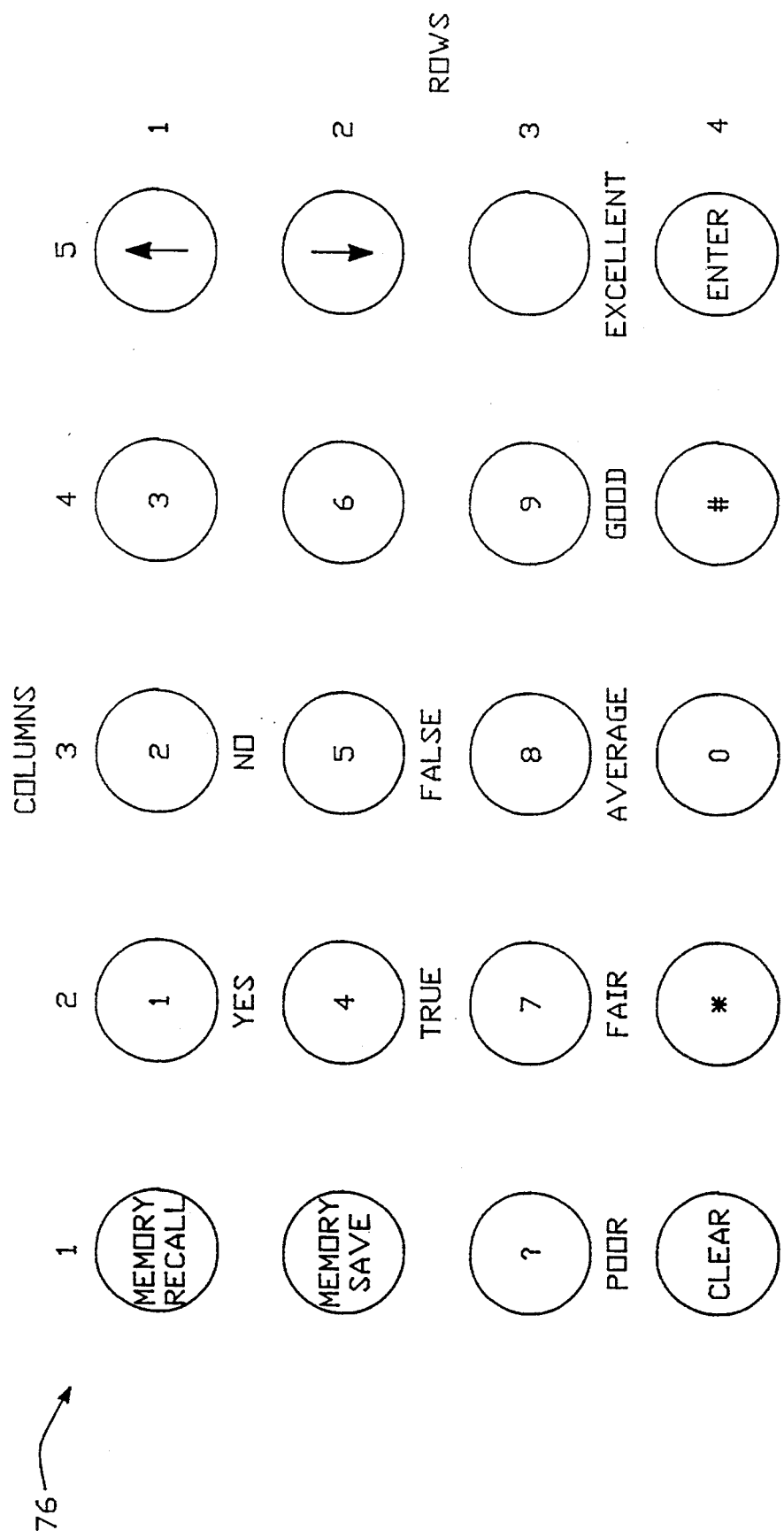
FIG. 9 depicts an embodiment of a keypad layout for the defense of FIG. 8.

The keypad 76 should be a 1-piece molded rubber type with carbon contacts that make switch connections against a switch pattern on a printed circuit board (PCB). The words under nine of the keys (YES, NO, TRUE, FALSE, POOR, FAIR, AVERAGE, GOOD, EXCELLENT) are part of the plastic case 94 and not part of the keypad 76. The keypad 76 is arranged as four rows times five columns. FIG. 9 shows the arrangement and names all twenty keys.

The handheld device 28 derives power, in a preferred embodiment, from four 'AA' size cells that must be replaceable by the consumer via a removable door on the back of the unit.

The IR receiver 70 will have two windows of red tinted plastic that filter visible light in the front left and right corners of the case. IR receive circuitry will be mounted on the PCB behind both of these windows.

The "T" shape device 28 accommodates a relatively wide LCD display 80 (approximately four inches) and a relatively narrow keypad 76 into a package that can be either set on a table or held in a consumer's hand.

The microprocessor 72 includes, in a preferred embodiment, a Mitsubishi M38002M2-FP with 8K-bytes of internal ROM in a plastic quad flat pack package. The microprocessor 72 operates in a memory expansion mode at a crystal frequency of 5MHz crystal.

The assignments of I/O pins to specific functions are shown in Table 1 below.

TABLE 1

MICROPROCESSOR I/O PIN ASSIGNMENTS

| PQFP PIN NUMBER | PIN NAME | DESCRIPTION |
| --- | --- | --- |
| 56 | P30 | Column 5 Keypad Scan Output |
| 3 | P60 | Column 4 Keypad Scan Output |
| 2 | P61 | Column 3 Keypad Scan Output |
| 1 | P62 | Column 2 Keypad Scan Output |
| 64 | P63 | Column 1 Keypad Scan Output |
| 63 | P64 | Row 4 Keypad Scan Input |
| 62 | P65 | Row 8 Keypad Scan Input |
| 61 | P66 | Row 2 Keypad Scan Input |
| 60 | P67 | Row 1 Keypad Scan Input |
| 11 | INT2 | Active Low Keypad Key Hit Interrupt |
| 21 | P40 | Real-Time Data |
| 20 | P41 | Real-Time Output Enable |
| 10 | P51 | Real-Time Clock |
| 9 | P52 | Real-Time S1- |
| 8 | P53 | Real-Time S2- |
| 55 | P31 | LCD Contrast MSB |
| 58 | P71 | LCD Contrast |
| 59 | P70 | LCD Contrast LSB |
| 12 | SRDY- | Not Used |
| 14 | TXD | Not Used |
| 15 | RXD | Serial NRZ Data From IR Receiver |
| 17 | INT0 | Carrier Detect (Any Level) |
| 16 | INT1 | IR Data Clock (Rising Edge, Tie to SCLK) |
| 13 | SCLK | IR Data Clock (Rising Edge, Tie to INT1) |
| 4 | P57 | LCD Power Enable/Disable (ENABLE = 0) |
| 5 | P56 | Low Battery Input |
| 6 | P55 | 32K-Byte Static RAM Write Protect |
| 7 | P54 | Piezoelectric Speaker Output (Pulses) |
| 48 | AD0 | Address Bus 0 |
| 47 | AD1 | Address Bus 1 |
| 46 | AD2 | Address Bus 2 |
| 45 | AD | Address Bus 3 |
| 44 | AD4 | Address Bus 4 |
| 43 | AD5 | Address Bus 5 |
| 42 | AD6 | Address Bus 6 |
| 41 | AD7 | Address Bus 7 |
| 40 | AD8 | Address Bus 8 |
| 39 | AD9 | Address Bus 9 |
| 38 | AD10 | Address Bus 10 |
| 37 | AD11 | Address Bus 11 |
| 36 | AD12 | Address Bus 12 |
| 35 | AD13 | Address Bus 13 |
| 34 | AD14 | Address Bus 14 |
| 33 | AD15 | Address Bus 15 |
| 32 | DB0 | Data Bus 0 |
| 31 | DB1 | Data Bus 1 |
| 30 | DB2 | Data Bus 2 |
| 29 | DB3 | Data Bus 3 |
| 28 | DB4 | Data Bus 4 |
| 27 | DB5 | Data Bus 5 |
| 26 | DB6 | Data Bus 6 |
| 25 | DB7 | Data Bus 7 |
| 49 | RD- | Read Strobe to Static RAM |
| 50 | WR- | Write Strobe to Static RAM and LCD |
| 51 | SYNC | Not Used |
| 52 | PHI | Not Used |
| 53 | RESETOUT- | Not Used |
| 54 | ONW- | 1 Wait State for LCD |
| 22 | XIN | Connect 5 MHZ Crystal |
| 23 | XOUT | Circuit Across XIN/XOUT |
| 19 | RESET- | Active Low Rest From Power Detect |
| 18 | CNVSS | Connect to VSS for Internal ROM |
| 24 | VSS | VSS from Battery − |
| 57 | VCC | VDD from Battery + |

The keypad 76 is scanned by the microprocessor using five outputs and four inputs. The four inputs are diode-or'ed together such that any keypress will produce an interrupt to the microprocessor. These active low interrupts occur when a key is pressed.

Figure 10:
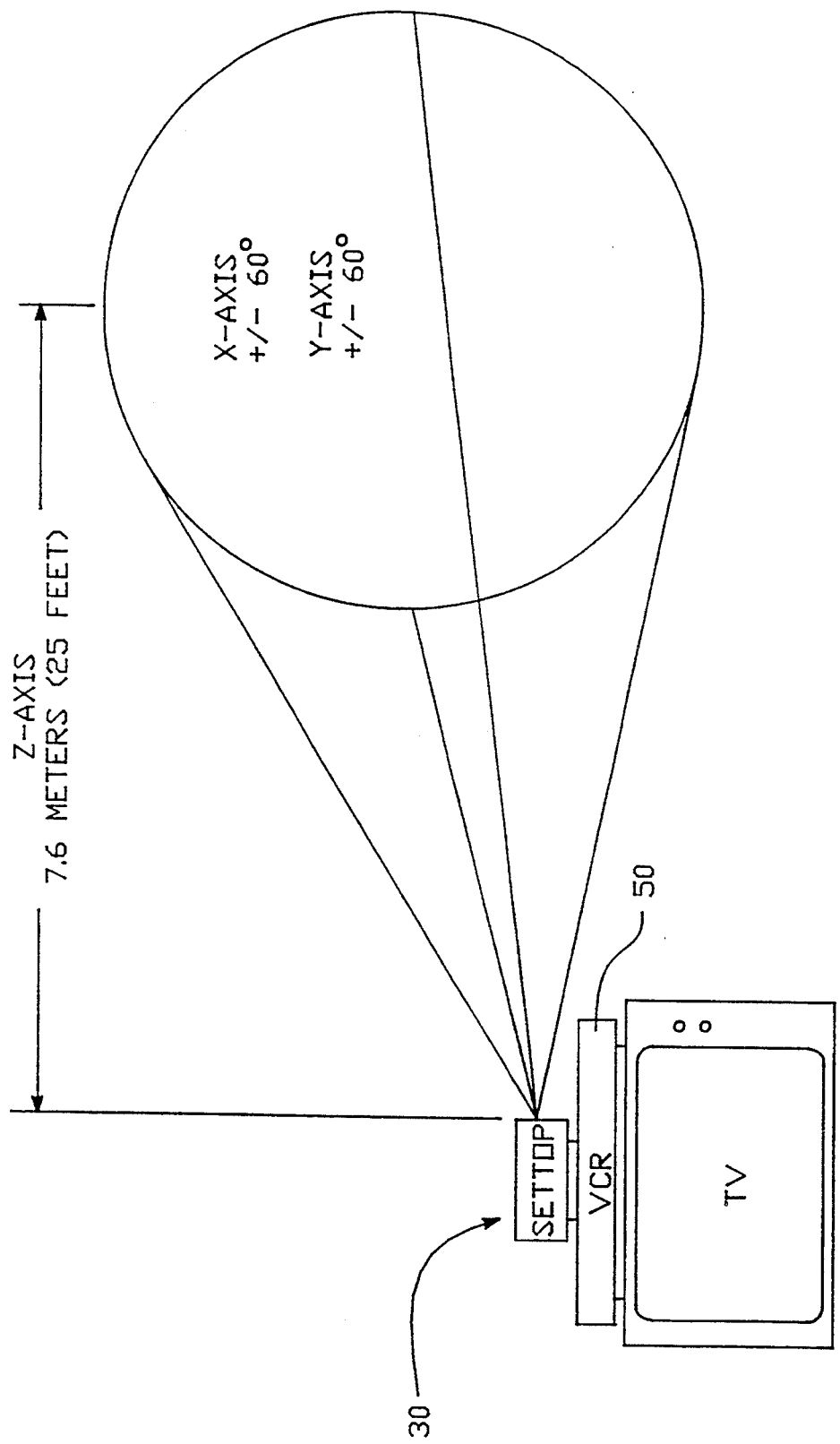
FIG. 10 depicts a representation of the IR coverage area for the invention of FIG. 1.

The handheld device 28 receives all remote data from the settop unit 30 via an infrared (IR) data link. The performance of this link must have a bit error rate less than one error for every 100,000-bits transmitted (random bit errors) when in the configuration shown in FIG. 10. In this configuration, the handheld receiver 28 is 76 m (25 feet) from the transmitter of the settop converter 30 and anywhere within plus or minus 60 degrees of the centerline of the transmitter.

Figure 4:
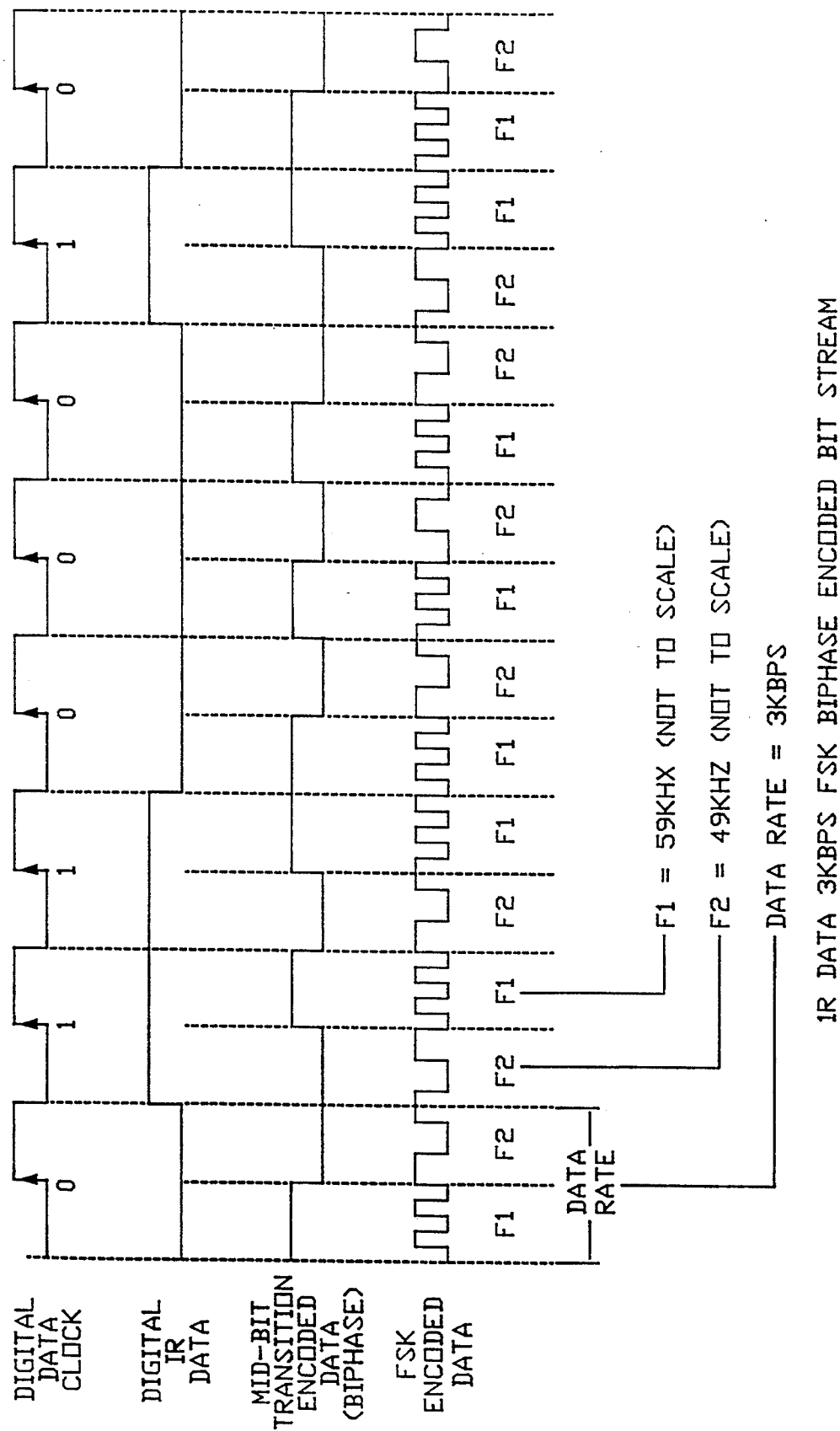
FIG. 4 depicts the IR data stream embodied as an FSK biphase encoded data stream.

As indicated above, the physical format of the IR data is an encoded FSK signal. The lower frequency is a 49 KHz and the upper frequency will be 59 KHz. The data rate is a 3000 bits/seconds (BPS). FIG. 4 shows the format of this data. The first line is the digital clock. The second line is the stream of digital IR data. The third line is the equivalent line mid-bit transition encoded data and the fourth lines shows the data FSK encoded. The FSK data is applied to the IR transmitting LEDs on the settop unit 30 and received by the diodes in the handheld device 28. The FSK data is decoded into mid-bit transition data, from which a clock is extracted and the data returned to the digital format. The microprocessor 72 uses the clock to shift the data into an internal serial port running in the synchronous mode. As indicated previously, the clock that is extracted as shown on the first line (FIG. 4) and is called the digital data clock.

To minimize power consumption, the IR receiver 70 should be preceded by a carrier detect (CD) filter 96 (FIG. 6). When energy in the 46–62 KHz range is detected then the carrier defect filter 96 is said to be active. This signal will actually switch power to the IR receiver with a VDD switch (a MOS transistor gate circuit in a preferred embodiment) which will remain powered while the IR data is received. After the IR data transmission from the settop unit 30 is complete the CD signal will go inactive and will remove power from the IR receiver 70. The CD filters 96 consumes as little current as possible since it is active all of the time. The logic level of the CD signal is a "don't care" for the microprocessor 72 and is chosen based on the lowest power consumption or cost of the CD circuit.

Static RAM

Figure 11:
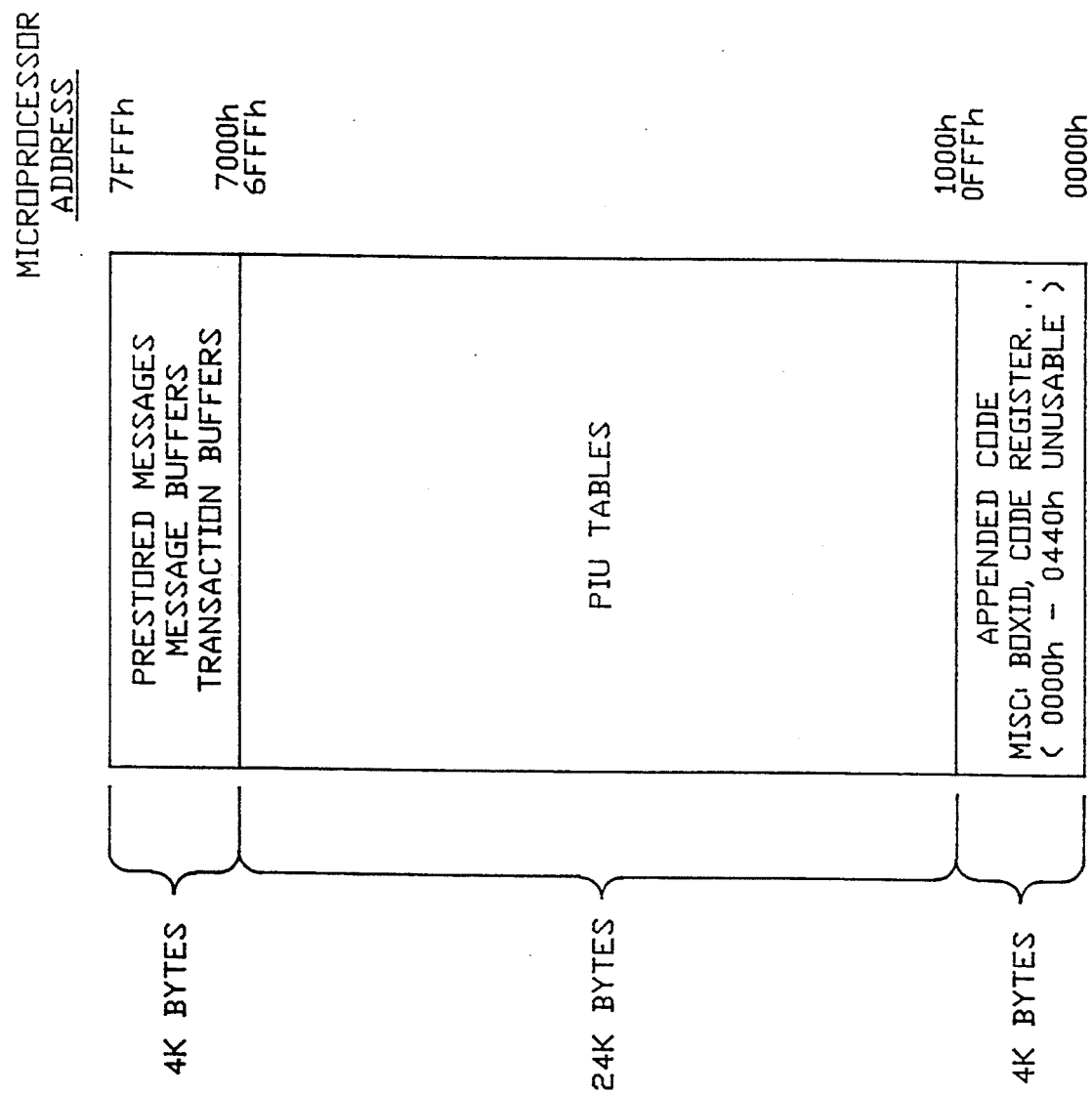
FIG. 11 depicts an embodiment of the memory map of the static RAM .of an embodiment of the handheld terminal of the invention of FIG. 1.

FIG. 11 shows the memory map of the 32 K-byte static RAM 74. The static RAM 74 will be decoded into microprocessor addressees 0000h to 7FFFh. The first 400 h locations of the external RAM 74 will be unused since these locations are internal to the microprocessor. The static RAM must run with zero wait states.

Figure 12:
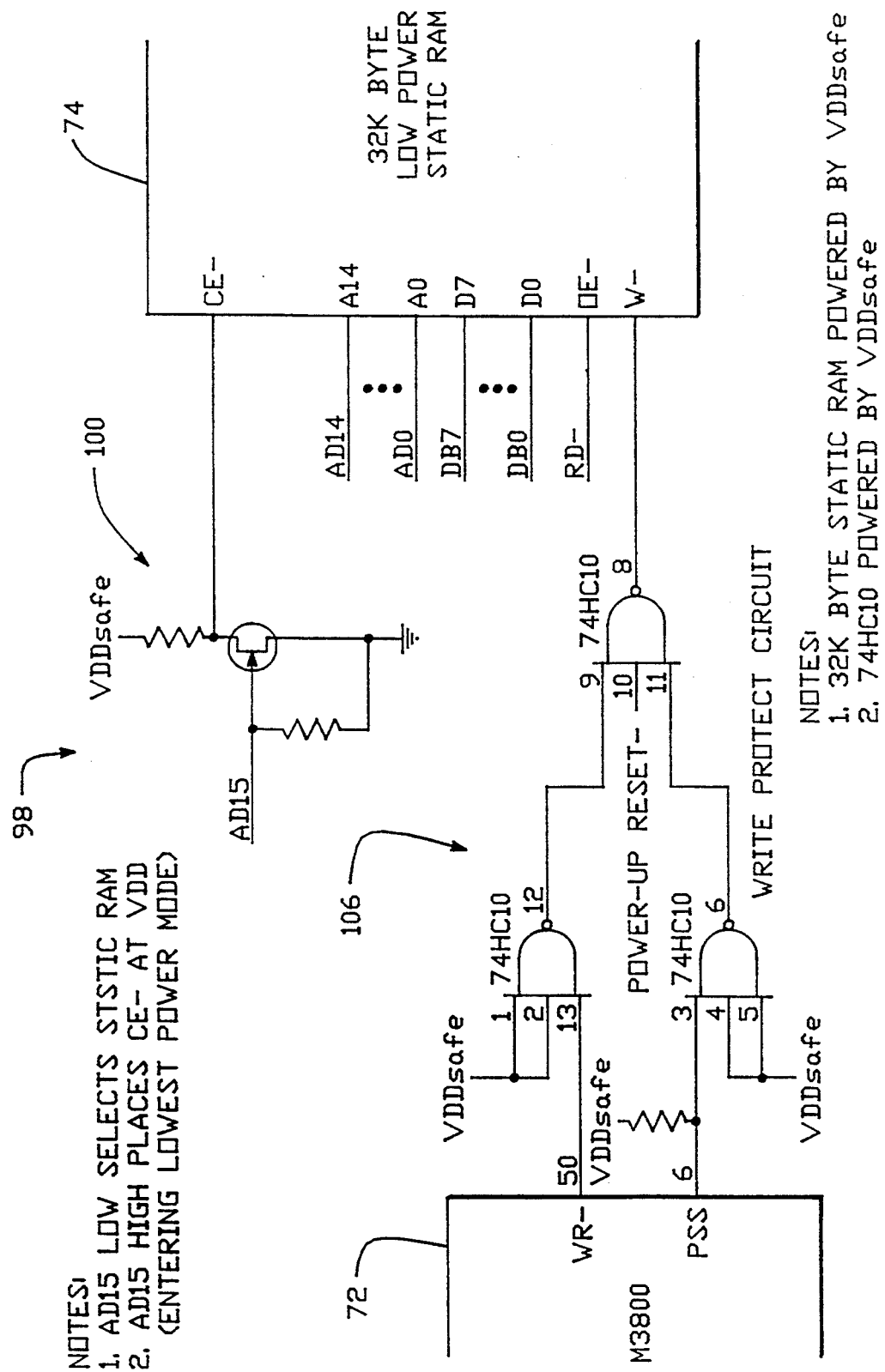
FIG. 12 depicts a schematical representation of the static RAM interface of an embodiment of the handheld terminal of the invention of FIG. 1.

FIG. 12 shows the 32 K-byte static RAM interface 98. It is important that the chip select (CE-) pin of the RAM be higher than VDD-0.2 when not being accessed in order to be in the lowest power mode. This is the reason for the transistor circuit 100 at the CE- pin in FIG. 12. This extremely low power mode is found on the latest currently available versions of static RAM chips and results in a current draw of about 2uA at room temperature.

The static RAM 74 chip (like the real-time clock) will be powered by the power fail detect circuitry 78 that changes over to the lithium coin cell 102 when loss of power from the main four 'AA' cells 104 is detected. This power is referred to as VDDsafe in FIG. 6.

The 32 K-byte static RAM 74 has write protect circuitry 106 that requires the microprocessor 72 to place a logic low on an I/O pin before any write operation can be performed and will prevent false writes to the static RAM 74 during reset (which is active whenever VDD is invalid). The write protect circuit 106 is also powered by VDDsafe. It is noted that address bus lines AD14 and AD15 are pulled up to VDD for the memory address decoding to work properly.

The LCD display 80 is a two line by 24-character display with built in display RAM and character generator RAM. No backlight is used. The LCD display 80, in a preferred embodiment, shall conform to the features of the Sharp LM24255 (preprogrammed character generator ROM and eight character generator RAM locations).

The LCD display is mapped into memory at microprocessor addresses 8000h (control register) and 8001h (data register). The timing of the typical LCD display 80 module indicates that one wait state may be required during accesses and the microprocessor ONW-line is appropriately controlled to accomplish this task (see Table 1).

To allow the microprocessor to control the LCD contrast in software a R/2R ladder network is to be implemented using three I/O bits of the microprocessor (see, Table 1).

The LCD design does not have a low power mode. To extend battery life, the LCD power must be controlled by an I/O bit from the microprocessor. FIG. 6 shows this as a VDD switch 108. This can be, in a preferred embodiment, a MOS transistor gate circuit that will allow power to the LCD when the microprocessor control signal is low.

The Epson RTC-4503 chip is the preferred real-time clock 78. It is connected to the microprocessor 72 with I/O pins. The real-time clock 76 (like the static RAM 74) is powered by the power fail detect circuitry that will change over to the lithium coin cell 102 when loss of power from the main four 'AA' cells 104 is detected. This power is referred to as VDDsafe above.

The piezoelectric speaker 88 will produce musical tunes and tones. The frequency response of this unit is within the range of 1 KHz or below on the low end and 5 Khz or above in the high end. Within this range, the sound pressure output of the piezo is level. The sound pressure level output should be in the range of 20 dB to 30 dB.

The speaker 88 is driven by one of the timer outputs of the microprocessor 72 running in the pulse output mode.

The preferred main source of power is four 'AA' cells 104. There is an additional three volt lithium coin cell 102 that powers the 32 K-byte static RAM 74, write protect circuitry 110, and the real-time clock 78 when loss of main power is detected since these must remain powered at all times. Main power is lost when the four 'AA' cells are either drained below minimum working voltage or are removed entirely. The power derived only from the main batteries is referred to as VDD. The power that is output from the power fail detect circuitry that is powered by the three volt lithium coin cell is referred to as VDDsafe as indicated above.

SOFTWARE STRUCTURE

The features of a particular interactive program are implemented in part in software resident in the handheld terminal 28. This software performs two functions. The first function is to build a short interactive program from high level commands transmitted via the IR link.

After the program has been transmitted and verified by a CRC error check, the software enables the program to be executed. The second function is the execution of the program. Each independent program that is transmitted and executed is called a transaction. A typical transaction would consist of a sequence of a question asking for a response from the participant followed by a test of the response resulting in a score.

During the time that the participant is responding to the transaction, the next transaction is being received and made ready for the participant to process. Using this approach, the amount of information transmitted via the network prior to a participant being able to use the handheld device 28 is essentially transparent to the user compared to other prior interactive devices.

Timed responses where the participant must react within a specific time interval is controlled either by a countdown timer implemented with the microprocessor 72 within the handheld terminal 28 or via a new transaction being sent and activated before the participant enters the response to the prior question.

For a question where the viewer has a predetermined amount of time to provide an answer, the input command requesting the answer includes a time in seconds that the handheld device 28 waits for user input.

After completing an interactive game, a resulting score is encoded with the program code and a box serial ID number to establish an authorization number unique for the viewer. Using a touch tone telephone, the viewer may enter their results for prizes or recognition.

Data Transmitted via the IR Link:

The interactive programs and messages are transmitted over the IR link in a data format structured as a packet containing all of the interactive commands required for a participant to use the handheld device 28. The structure of this packet is as follows:

| | |
|---|---|
| Sync | 3-bytes of all ones |
| Packet ID | 3-bytes |
| Packet Count | 2-byte |
| Command 1 | |
| | Interactive Program |
| Command i | |
| CRC | 2-bytes |
| End of Frame | 3-bytes of all ones |

The sync block and end of frame block are three-bytes with a bit pattern that is unique within the packet. This approach clearly defines the start and end of each packet.

The packet ID consists of 24-bits (3-bytes) with the bits segmented into a programmer ID of 9-bits, a program ID of 12-bits, and a PIU slot address of 3-bits. bits.

The PIU table (200 of which are located in RAM 74) where data is stored corresponds to an unique PIU code. Each programmer as defined by the programmer ID has a specified number of tables available for their use. The PIU slot address defines which table within the programmer's set of table may be used by the interactive program.

The software process within the handheld device 28 consists of the packet being received correctly over the IR link. The programmer ID and the slot address is used to select a PIU table. If a table does not exist with the same programmer ID and slot address, a new table is created. If the table exists and the programmer ID is the same for the new transaction compared to the stored ID in the table, the old values in the table are kept and the interactive commands transmitted within the packet are processed. If the new program ID of the table are different, the table values are erased before processing the packet.

The command structure is encrypted using a conventional FEC algorithm with one half rate coding to improve data transmission reliability. It is also encrypted using a key ranging up to 56-bits. Within the handheld device 28, a total of three keys are stored. A command to modify the third key is defined and is available for changing the key in the event the three keys become known.

Interactive Software Commands

In order to reduce the time required to send an interactive program via the IR link, a high level interactive language was invented. This concept reduces the amount of data that must be transmitted to a few powerful commands. The specific order and collection of these commands within the packet determine the interactive program. The user's response to these commands implement the interactive program.

An interactive program consists of one or more packets of commands that are sent via the IR link and processed by the control program of the handheld device 28. Each handheld device 28 contains the interactive program transmitted via the IR link and can generate a score or response unique to the individual participant.

| | Copyright © 1991 Watch & Win: |
|---|---|
| COMMANDS | The handheld device implements transactions, events, and PIUs through interpreting a set of commands inserted by programmers at the insertion system 22 and transmitted over the data path by, for example, broadcast signals, to decoding system 24. These commands are created by the programmer using a software package provided with the insertion system 22. The following commands represent the main types of functions that are implemented. Table 2 attached, includes a further list of commands |
| Display (msg) | The message is displayed on the LCD and remains on the LCD display until one of the following conditions or events occurs:<br>    Another message is processed.<br>    The Recall button is pressed.<br>    Other special messages are displayed if the appropriate button is pressed.<br>    No data is transmitted to the handheld within 15 seconds and the viewer has not pressed any buttons (at which time the handheld device powers down).<br>If the viewer attempts an invalid input, the display does not change. |
| Input (msg) | The message is displayed and the unit waits for input as described below:<br>    A time delay INPUT (msg, counter) request is one where the amount of time in seconds is transmitted along with the input command. For timed input, while waiting for the counter to reach zero, the two (or three) digit time value is displayed in the bottom right two (or three) screen display characters.<br>    If the counter times out before any input by the viewer, the handheld device displays MSG1. |

|  |  |
|---|---|
|  | An open ended INPUT (msg) request is one where the unit waits for input until the next transaction is received. If the viewer provides a response after the next transaction is received, the response is ignored and the transaction containing the INPUT command is flushed from the unit. Alternatively, the last response could be interpreted as a response to the next subsequent transaction. The handheld device waits until the enter key is pressed before processing the response. The number of keys entered from the keyboard can be limited by the field width variable. If the field width is one, then an enter key is not needed to terminate an input response. If the Timeout variable is not zero, then the input command will be timed. If the timer expires, the command will automatically terminate and the input response ignored. Example: INPUT "How much are you willing to bet?", 3, 33 [OPCODE] [Field Width] [X Offset] [String] [Null] INPUT "How much are you willing to bet?", 3, 33, 10 [OPCODE] [Field Width] [X Offset] [Timeout] [String] [Null] |
| Range (x,y) | Associated with the INPUT command prescribing the range of acceptable key inputs that is the range of value that are acceptable as answers. When the viewer response is detected, the unit confirms that the response is within the range and processes the next command within the transaction. If the response is not between "x" and "y" values, the unit displays MSG2 and waits for a new input. If the second response is still not within the range, the unit displays MSG3, clears the input buffer and processes the next command Example: RANGE T0, T1 [OPCODE] [LOW REGISTER] [HIGH REGISTER] (3-bytes) RANGE 1, 2 [OPCODE] [LOW VALUE] [HIGH VALUE] (9-bytes) |
| Add (x,y) | The programmer can add the value in location x to the value in location y, where the sum is stored in location y. |
| Sub (x, y) | The programmer can subtract the value in location x from the value in location y, where the result is stored in location y. |
| Save (x,y) | The programmer can save the value in location x (or a value itself) in location y. The previous value in location y is lost. |
| CONDITIONAL: | |
| If, Then, And, Or And, Or | The programmer can establish logic and arithmetic function using >, <, > =, < = or = as a test of either keyed input, stored responses, or stored scores to do other logic steps. A typical example is as follows: Example: IF TSCORE > THEN DISPLAY "Good Work!" IF (RESP 1 == T0) THEN [OPCODE] [Operator] [Operand A] [Operand B] [True Offset] [False Offset] IF (RESP 1 == T0 and (RESP 2 == T1) |
|  | THEN [OPCODE] [# of Op's] [Op] [Op$_1$] [Op$_2$] [Op] [Op$_3$] [OP$_4$] [Op] [True Offset] [False Offset] |
| Else | Used a part of IF statement to signify alternative processing for, as an example, wrong INPUT responses. |
| Beep (x,y,z) | This will generate an audio sound from the handheld device 28, where x is the number of beeps, y is the duration in seconds of each beep, and z is the number of seconds between each beep. |
| Shift (x,y) | This command is used to indicate a multiplication desired by the programmer. The value in location y can be multiplied by 2(x = 1), 4(x = 2), 8(x − 3), or 16(x = 4). |
| Repeat (msg x,y,z) | A command which results in multiple DISPLAY and other logic commands being sent to the handheld device 28. Using REPEAT, the programmer can request that a message be displayed on the handheld device 28 every x minutes, that the message be sent to the handheld device 28 every y minutes, and that the message stop being displayed after z minutes. |
| Hold (x) | A command sent to and used by the data inserter 38 which tells the inserter 38 not to insert any background information on line x until the line is released using a RELEASE command. |
| Release (x) | A command sent to and used by the data inserter 38 which tells the inserter 38 that it is OK to insert background commands on line x. |
| Delete (PID) | This is a command used to delete the PIU table from non-voltage memory to make room for new PIUs. A background task of sending a group of DELETE commands for known completed PIUs will be initiated when it is detected that PIUs have not been deleted normally. Example: DELETE PID NUMBER [OPCODE] [PID NUMBER] (4-bytes) |
| Prestore (msg, MSGx) | Stores a standard message in message buffer of non-voltage memory in the handheld device 28, in location MSGx (MSG5–MSG10 are still available). A DISPLAY command can either designate that a free form message or a prestored message be displayed on the screen. Example: PRESTORE 5, "Please try again." OPCODE] [MSG#] [STRING] [NULL] |
| Disable (boxid) | Reset the handheld device 28 to its uninitialized state. Example: DISABLE 12345678 [OPCODE] [BOX ID] (5-bytes) |
| Appendcode | The command to add a new block of assembly level (exentable) code to the memory in the handheld device 28. |
| DEFINE NEW ADDRESS KEY: | This Opcode will load a new address key to be used to descramble the next program segment to be executed. Example: KEY 1234 [OPCODE] [KEY] (3-Bytes) |
| UN- CONDITIONAL BRANCH | This Opcode is used to transfer program execution to a different Opcode within the program. Example: GO TO LABEL [OPCODE] [16-Bit 2's Comp. Offset] (3-bytes) |
| EXIT: | Used to signal the software for the handheld device 28 that the current program is finished. Example: |

-continued

| | EXIT | |
|---|---|---|
| | OPCODE | (1-byte) |

Table 3 presets a list of prestored messages.

SOFTWARE REGISTERS RESIDENT IN HANDHELD DEVICE 28:

| | | |
|---|---|---|
| PIU TRANSACTOR REGISTERS | 200 PIU tables are used by the software to store user responses and game scores. The transaction register contents are maintained until a program deletes the PIU table or the registers are used by another program. The registers defined in each table are: | |
| | PID | Programer ID Number |
| | Flag | Programable Flag Register |
| | Score 1 | Event Score Register |
| | Score 2 | Event Score Register |
| | Score 3 | Event Score Register |
| | RESP1 | User Response Register |
| | RESP2 | User Response register |
| | RESP3 | User Response Register |
| | REGISTER 1 | Program Storage Register |
| | REGISTER 2 | Program Storage Register |
| | REGISTER 3 | Program Storage Register |
| | REGISTER 4 | Program Storage Register |
| | Counter | Elapsed Timer for Viewer Response |
| SCRATCH PAD REGISTERS | Scratch pad registers are used by the program for temporary storage. The value of each register is cleared at the start of each program. There are 16, 32-bit registers available. | |
| DATE/TIME REGISTERS | Used to verify program execution Date and Time. Registers available for program use are: | |
| | Minute | |
| | Hour | |
| | Day | |
| | Month | |
| | Year | |
| BOX ID REGISTER | A four-byte register that contains a unique set of numbers for each handheld device 28. | |
| CODE REGISTER | A four-byte register stored in non-volatile memory for global program usage. | |

Table 4 presents an example of interactive games that can be played with this system.

INDUSTRIAL APPLICABILITY

The operation of the transaction based interactive television system 20 of the invention is as follows:

In a preferred embodiment, at the programming or source end of the system, an event such as, for example, a sports event, a quiz show or an educational presentation is mated with interactive data in order to associate a series of inquiries and response with the event. The series of queries and responses are, in a preferred embodiment, inserted into the designated lines of the vertical blanking interval much as closed captioning signals are inserted in the VBI. Thus, the standard NTSC signal carries the traditional programming in addition to encoded data of the present invention. This signal is then communicated by broadcasts, satellite, cable, microwave or telephone lines, and any combination thereof to remote user's which have a VCR or television receiver, television monitor and the proprietary handheld device 28 of the present invention. As the signals are encoded in the vertical blanking interval, such signals are not apparent to standard viewer at a remote location without a proprietary decoding system 24, which includes the handheld device 28 and the settop decoder 30. Thus, the NTSC signal is received without the viewer knowing or being disturbed by any other signals of the present invention. With the decoding system 24, the viewer is able to receive, decode, and thus interact with the presentation on the television screen.

In much the same way as closed caption VBI decoders work, the settop decoder 30 detects the proprietary programming data recorded on the lines in the vertical blanking interval and decodes this data. The data is then transmitted through an infrared transmitter to a handheld device 28 which has infrared detectors. This signal once detected by the handheld device 28 is then used to initiate functions of the handheld device 28. Principal among these functions are the display of messages of the LCD display 80 and the creating and updating of the PIU tables which are associated with each transaction of the event.

Thus, the proprietary high level command language transmitted in conjunction with the standard television broadcast signal is used to activate the handheld device 28. This command language is used to cause the executable code also sent over the VBI to fill in the PIU tables stored in the handheld device in order to update and create new transactions, to perform the various message functions of the handheld device, and to initiate the various transactions. Such an arrangement eliminates the need for the viewer (1) to wait for the downloading of main programs and (2) to be tuned to the appropriate stations before the game begins in order to obtain the entire game program.

The high level proprietary language affords commands and also allows for a rapid delivery of executable code which resides in the PIU tables. Each programmer or program creator at the PIU insertion system 24 would have its own program or ID number and the ID number of a number of PIU tables. Thus, the programmer can insert, at any time, in the VBI new information needs to go into the PIU table. As explained above, each PIU table includes a transaction for at least one response to an interactive inquiry from the programmer. Each of these transactions can be associated with a different game or event occurring throughout the programming and a number of these transactions or PIU tables can be linked together in order to create a series of continuous interactive transactions throughout an interactive session. For example, in the situation of a commercial broadcast of a live sports event with interleaved commercials, a number of PIU tables can be associated together to present interactivity throughout the length of the sports event. Further interleaved with the activity of the main sports event, the various commercials can each be assigned their own PIU table and interleaved throughout the main interactive event. Thus, the viewer can interact with the transactions of the main event and also interact with the transactions of each of the separate commercial events and have all the scores and responses recorded.

It is noted from the above that the implementation of the PIU tables breaks down the games and events into individual transactions. These tables can be quickly created from information encoded on the VBI. Tables as indicated above, are identified with a programmer ID. The tables are maintained in, for example, the static RAM as long as need. Should the games change, the programmer simply sends a new signal in order to re-program that location in the static RAM. In the present embodiment there are several hundred tables, and each is capable of allowing the user to play a game. Thus for a game on a commercial, each game would have its own PIU table and main game played with the main feature may have a multiplicity of PIU tables.

It follows from the above that the present embodiment allows the viewer to come in at any time during the program and immediately begin to play games or otherwise interact with the television and also to "graze" or switch between several stations and immediately be able to play or interact with each channel. This is an improvement over the prior art devices which require that only one game at a time be played, that the user wait for the information to be downloaded to the system, and that does not allow for the interleaving of various games. Further, prior art devices cannot allow the viewer to begin or leave the game at any point in time and have the score for the portion of the game played recorded.

Even with interleaved games and with viewer's coming and leaving the screen at various times, the viewer's reactions and answers to all games in which the viewer participates are stored by the system and later reported to a central processing station.

Finally, after the events are concluded, the viewer will receive a score or scores from the handheld device 28. The score is encoded along with, for example, the user identification number and the identification number of the handheld device 28. The viewer can then telephone a central processing station and with the use of a touch tone telephone key in the score and the identification information received from the handheld device 28.

It is further to be understood that the present system can be encrypted using encryption algorithms and keys as is known in the trade. The handheld device 28 would thus store, for example, three keys at least one of which could be reprogrammed by a signal sent on the VBI.

It should also be appreciated that with the present system that a series of events can be linked together. For example, the system can afford the viewer the ability to participate in an interactive event which strings together the four or more games of a world series baseball event. That is to say that the viewer is asked to the pick the winner of each of the games of a world series and the winner of the world series. This information could be stored in the handheld device 28 over a period of days or longer if necessary for other games and then checked against the actual outcome of the individual games and series. The user's score over a period of time could then be encoded and then reported back to the central station by the users.

Other aspects and embodiments of the present invention can be viewed from a view of the figures and a review of the claims.

It is to be understood that other embodiments of the present invention could be configured and come within scope and spirit of the appended claims.

We claim:

1. An interactive presentation system comprising:
   means for receiving interactive data in association with a presentation of a first interactive event and one or more interactive aspects of said first interactive event;
   said receiving means including means for defining and updating transaction structures (1) for allowing said interactive data to be communicated only as needed for the first interactive event and for each of said one or more interactive aspects of the first interactive event and through the first interactive event and (2) for allowing the first event and said each of said one or more interactive aspects of the first event to be interleaved with at least a second interactive event or an interactive aspect of the second event while maintaining interactivity with each of said first and second interactive events and said each interactive aspect thereof, such that a participant can selectively choose to interact with less than all the first and second events and said interactive aspects thereof and still maintain interactivity with those events and interactive aspects chosen; and
   said receiving means including means responsive to said interactive data for presenting the participant with the selectively chosen events and interactive aspects.

2. The system of claim 1 wherein said receiving means includes:
   a settop decoder for decoding said interactive data received in conjunction with the first event;
   a handheld terminal for allowing the participant to interact with the first event; and
   means for providing communications between the settop decoder and the handheld terminal.

3. The system of claim 2 wherein:
   said means for providing communications includes an infrared encoder and transmitter associated with the settop decoder and an infrared receiver and decoder associated with the handheld terminal.

4. The system of claim 1 wherein said means for defining and updating transaction structures includes:
   means for storing an identification for each of a plurality of said transaction structures; and
   means for storing that portion of said interactive data in said transaction structure which is required for one of said one or more interactive aspects of the first event immediately before or during when said one aspect is to be interacted with.

5. The system of claim 1 wherein:
   said interactive data includes (1) interactive commands and (2) event specific data;
   wherein said interactive data is stored in the means for defining and updating the transaction structures; and
   said system includes processor means for processing the interactive commands in order to control the interactive presentation.

6. The system of claim 5 wherein:
   said receiving means including a message display; and
   said interactive commands in conjunction with the processor means causes messages to be displayed on said message display.

7. The system of claim 6 wherein:
   said receiving means can receive said messages to be displayed and said means for defining and updating transaction structures can store said received messages; and
   said interactive commands cause selectively either one of said received messages or one of said stored messages to be displayed in order to initiate or continue with the interactive presentation.

8. The system of claim 1 wherein:
   said means for defining and updating transaction structures allows said interactive data for one of said one or more interactive aspects of the first event to be used interactively by the participant while subsequent interactive data for a subsequent aspect of the first or second events is being received by the receiving means for subsequent use by the participant.

9. The system of claim 1 wherein:
said receiving means including means for decoding said interactive data encoded in a vertical blanking interval of a television signal.

10. The system of claim 1 wherein:
said receiving means includes means for receiving the interactive data at a high data rate and for substantially reducing the data rate so that the interactive data can be accurately received by the transaction structures of the defining and updating means.

11. The system of claim 1 wherein:
said receiving means for additionally allowing said interactive data to be received in a manner that is transparent to the participant.

12. The system of claim 1 wherein:
said receiving means can receive said first event on a first channel and can receive said second event on a second channel.

13. The system of claim 1 wherein:
said receiving means need not be tuned to either the first or second event from the beginning of either the first or second event in order to maintain interactivity with any of said aspects of the first or second events chosen by the participant.

14. The system of claim 1 wherein:
said means for defining and updating transaction structures includes score means for storing results of only those aspects of said first and second events that are interacted with by the participant.

15. The system of claim 14 wherein:
said score storing means can accumulate the results for each of said first and second events.

16. The system of claim 1 including:
means for reporting results of the interactivity.

17. The system of claim 1 including:
means for storing a participant response to said interactive data in said transaction structures.

18. An interactive presentation system comprising:
means for receiving interactive data which includes commands and event specific data as needed throughout a presentation of a first event having one or more aspects which make up the first event, in accordance with specific requirements of any particular said aspect of the first event and as needed immediately before or during the presentation of said particular aspect, such that a participant need only be tuned to said particular aspect and not from the beginning of the first event in order to participate in said particular aspect;
means for storing the event specific data; and
means for acting responsive to the commands in order to use the event specific data stored by the storing means to allow the participant to interact with said particular aspect of the first event of the presentation.

19. The system of claim 18 including:
means for presenting messages;
said means for acting responsive to the commands for causing the message presenting means to display at least one of a message sent in association with the commands and a message prestored as part of the event specific data.

20. The system of claim 18 wherein:
said means for acting responsive to the commands for initiating and controlling the ability of the participant to interact with the presentation and for controlling the event specific data.

21. The system of claim 18 wherein:
said receiving means includes a settop decoder for decoding said interactive data received in conjunction with said first event;
said storing means includes a handheld terminal for allowing the participant to interact with said first event; and
said system further includes means for providing communications between the settop decoder and the handheld terminal.

22. The system of claim 18 including:
a message display; and
said commands in conjunction with the acting means for causing messages to be displayed on said message display.

23. The system of claim 18 wherein:
said receiving means including means for decoding said interactive data encoded in a vertical blanking interval of a television signal.

24. The system of claim 18 wherein:
said receiving means including an infrared encoder and transmitter and the storing means includes an infrared receiver and decoder for communicating said interactive data between the receiving means and the storing means.

25. The system of claim 18 wherein:
said receiving means including means for receiving the interactive data at a high data rate and for substantially reducing the data rate so that the interactive data can be accurately stored by the storing means.

26. The system of claim 18 wherein:
said receiving means and said storing means for additional allowing the interactive data to be received in a manner that is transparent to the participant.

27. The system of claim 18 wherein:
said receiving means receives interactive data such that the interactive data does not interfere with the presentation of the first event on a television monitor.

28. The system of claim 18 wherein:
said means for storing event specific data including means for defining and updating transaction structures (1) for allowing the event specific data to be communicated only as needed for each of said one or more aspects of said first event and throughout said first event such that the participant need only be tuned to one of said one or more aspects and not previous aspects of the first event in order to participate in said one aspect of said first event and (2) for allowing said first event and said one or more aspects within said first event to be interleaved with at least a second event and any aspects within said second event while maintaining interactivity with any of said aspects of said first and second events to which the participant is tuned.

29. The system of claim 28 wherein said means for defining and updating transaction structures includes:
means for storing an identification for each of a plurality of said transaction structures;
means for storing at least a portion of the event specific data; and
means for storing a user response to the event specific data.

30. The system of claim 28 wherein:

said receiving means can receive messages to be displayed and said means for defining and updating transaction structures can store said received messages; and said commands for causing, in conjunction with the acting means, selectively either one of said received messages or one of said stored messages to be displayed in order to initiate or continue with the interactive presentation.

31. The system of claim 28 wherein
said means for defining and updating transaction structures for allowing said interactive data for one of said aspects of the first event to be used interactively by the participant while subsequent interactive data for a subsequent aspect of the first or second event is being received by the receiving means for subsequent use by the participant.

32. The system of claim 28 wherein:
either (1) said first event is presented on a first television channel and said second event is presented on a second television channel or (2) the first and second events are presented on the same television channel.

33. An interactive presentation system comprising:
means for receiving interactive data such that when a participant chooses to participate in a first event said interactive data includes a first set of commands and first event specific data, and when the participant chooses to participate in a second event said interactive data includes a second set of commands and second event specific data;

means, in communication with the means for receiving, for storing interactive data in programmer tables and for updating the programmer tables in response to the interactive data;

said programmer tables defined such that interactive data is only received as needed and said first event can be interleaved with said second event while maintaining interactivity with each of said first and second events; and means, in response to said interactive data and the programming tables, for presenting transactions such that when the participant chooses to participate in the first event the transactions presented are in association with the first event, and when the participant chooses to participate in the second event the transactions presented are in association with the second event;

wherein, said participant can change between the first event and the second event throughout the first event and the second event, thereby interleaving the first event with the second event and interleaving the transactions presented in association with the first event with the transactions presented in association with the second event while maintaining interactivity with each of said first and second events.

34. The system of claim 33 wherein:
said means for storing interactive data only stores interactive data needed for either of the first or second events or any portion of the first or second events immediately before or during when said event or portion thereof is presented and in a manner that is transparent to the participant, such that the participant can change back and forth between the first and second events and any portions thereof and maintain interactivity.

35. A method for making an interactive video presentation comprising the steps of:
constructing interactive data which is relevant to each aspect of one or more aspects, which when taken together comprises a first event of an interactive video presentation such that said interactive data relevant to said each aspect is selfcontained and does not rely on interactive data for a previous-in-time aspect of the first event; and sending said interactive data synchronized with said each aspect to which it relates to a participant such that the interactive data for said each aspect is received immediately before or during the presentation of said each aspect so that the participant need not be tuned to said first event from the beginning of said first event in order to interact with said each aspect to which the participant is presently tuned.

36. The method of claim 35 further including the steps of:
constructing interactive data which is relevant to each of one or more aspects, which when taken together comprise a second event of the interactive video presentation such that said interactive data relevant to said each aspect of said second event is self-contained and does not rely on said interactive data for a previous-in-time aspect of the second event; and interleaving at least one of said each aspect of the second event with at least one of said each aspect of the first event in order to make the presentation to the participant, such that the participant need not be tuned to either the first or the second events from the beginning of either the first or the second events in order to interact with said each aspect of the first event of said each aspect of the second event to which the participant is presently tuned.

37. The method of claim 36 including:
either (1) presenting the first event on a first television channel and presenting the second event on a second television channel or (2) presenting the first and second events on the same television channel.

38. The method of claim 35:
wherein said interactive data includes commands and event specific data, and wherein said commands can be used for a variety of aspects of said first event; and further including the step of sending only those commands and the event specific data relevant to said each aspect of said first event immediately before or during when said aspect is to be presented.

39. The method of claim 35 including the steps of:
sending events in addition to the first event to the participant, each of the additional events having at least one aspect; and allowing the participant to select any particular aspect of the first event or the additional events with which to interact and to subsequently select any particular subsequent aspect of the selected event or another event with which to interact.

40. The method of claim 35 including;
sending the interactive data such that the interactive data does not interfere with the presentation of the first event on a television monitor.

41. A method for making an interactive presentation comprising the steps of:
sending interactive data synchronized with one or more aspects of an event to which it relates to a participant such that the interactive data for each particular aspect is received immediately before or during the presentation of said each particular aspect so that the participant need not be tuned to said event from the beginning in order to interact with said each particular aspect to which the participant is presently tuned; and receiving by the participant the interactive data relevant to said each particular aspect of the event immediately before or during said each particular aspect of the event that is being presented, so that the participant does not need to receive any interactive data relevant to prior aspects of the event.

42. The method of claim 41 wherein the interactive data synchronized with said each aspect of the event includes a question and an answer, wherein said sending step includes sending the question and the answer.

43. The method of claim 41 including:

receiving the interactive data such that the interactive data does not interfere with the presentation of the event on a televisoin monitor.

44. An interactive presentation system comprising;

means for constructing interactive data which is relevant to each aspect of one or more aspects which when taken together comprise an event of an interactive presentation such that said interactive data relevant to said each aspect is selfcontained and does not rely on said interactive for a previous-in-time aspect of the event;

means for sending said interactive data synchronized with [the] said each aspect to which it relates to a participant such that the interactive data for said each aspect is received immediately before or during the presentation of said each aspect so that the participant need not be tuned to the event from the beginning of the event in order to interact with [the] said each aspect to which the participant is presently tuned; and means for the participant to receive the interactive data relevant to said each aspect of said event immediately before or during when said each aspect is being presented and interact with the interactive data and [the] said aspect of the event, so that the participant does not need to receive any interactive data relevant to prior aspects of the event.

45. An interactive presentation system comprising:

means for constructing interactive data which is relevant to each aspect of one or more aspects which when taken together comprise an event of an interactive presentation such that said interactive data relevant to said each aspect is selfcontained and does not rely on said interactive data for a previous-in-time aspect of the event; and means for sending said interactive data synchronized with said each aspect to which it relates to a participant such that the interactive data for said each aspect is received immediately before or during the presentation of said each aspect so that the participant need not be tuned to said event from the beginning of said event in order to interact with said each aspect to which the participant is presently tuned.

46. An interactive presentation system comprising:

means for sending interactive data synchronized with one or more aspects of an event to which it relates to a participant such that the interactive data for each particular aspect of said one or more aspects is received immediately before or during the presentation of said each particular aspect so that the participant need not be tuned to the event from the beginning of the event in order to interact with said each particular aspect to which the participant is presently tuned; and means for receiving by the participant the interactive data relevant to said each particular aspect of the event immediately before or during when said each particular aspect of the event that is being presented, so that the participant does not need to receive any interactive data relevant to prior aspects of the event.

47. The system of claim 46 including;

said receiving means receives interactive data such that the interactive data does not interfere with the presentation of the event on a television monitor.

48. A method of programming an interactive presentation comprising the steps of:

selecting a first event which has one or more aspects which when taken together comprise the first event as a whole; and constructing interactive data which is relevant to each aspect of the first event of the interactive presentation such that said interactive data relevant to each aspect is self-contained and does not rely on said interactive data for a previous-in-time aspect of the first event so that a participant can interact with said each aspect of the first event and the interactive data associated therewith without being required to receive or interact with interactive data associated with prior aspects of the first event.

49. The method of claim 48 including the steps of:

selecting a second event which has one or more aspects which when taken together comprise the second event as a whole;

constructing interactive data which is relevant to each aspect of the second event of the interactive presentation such that said interactive data relevant to each aspect of the second event is self-contained and does not rely on said interactive data for a previous-in-time aspect of the first or second event so that the participant can interact with said each aspect of the second event and said interactive data associated therewith without being required to receive or interact with interactive data associated with prior aspects of the first event or the second event, and interleaving selected aspects of the first and the second event.

50. The method of claim 49 including:

either (1) presenting the first event on a first television channel and presenting the second event on a second television channel or (2) presenting the first and second events on the same television channel.

51. A method of broadcasting an interactive presentation comprising the steps of:

broadcasting a first event and one or more aspects of the first event;

broadcasting interactive data which is relevant to each aspect of the first event such that said interactive data relevant to said each aspect is self-contained and does not rely on said interactive data for previous-in-time aspects of the first event; and said broadcasting step including the step of sending said interactive data synchronized with said each aspect to which it relates to a participant such that the interactive data for said each aspect is received immediately before or during the presentation of said each aspect so that the participant need not be tuned to the beginning of said first event in order to interact with said each aspect to which the participant is presently tuned.

52. The method of claim 51 including the steps of:

broadcasting a second event and one or more aspects of the second event, interleaved with the first event and said one or more aspects of the first event;

broadcasting interactive data which is relevant to each aspect of the second event such that said interactive data relevant to said each aspect of the second event is self-contained and does not rely on said interactive data for previous-in-time aspects of the first or second events;

said broadcasting step including the step of sending said interactive data synchronized with said each aspect of the second event to which it relates to the participant such that the interactive data for said each aspect of the second event is received immediately before or during the presentation of said each aspect of the second event so that the participant need not be tuned to the second event from the beginning of the second event in order to interact with said each aspect to which the participant is presented tuned; and interleaving the interactive data of the first and second events.

53. The method of claim 52 including:

either (1) broadcasting the first event on a first television channel and the second event on a second television channel or (2) broadcasting the first and second events on the same television channel.

54. A method for receiving an interactive presentation comprising the steps of:

receiving interactive data in association with a first interactive event and one or more interactive aspects of the first interactive event; and defining and updating transaction structures (1) for allowing the interactive data to be communicated only as needed for the first interactive event and for each of said one or more interactive aspects of the first interactive event and throughout the first interactive event and (2) for allowing the first event and said each interactive aspect of the first event to be interleaved with at last a second event or any interactive aspect of the second event, such that a participant can selectively choose to participate in less than all the interactive aspects of the first and second events and still maintain interactivity with those interactive aspects chose.

55. The method of claim 54 further including the step of:

storing scores from any of those interactive aspects chosen of the first and second events that are interacted with by the participant.

56. The method of claim 55 wherein:

said score storing step includes accumulating the scores from each of the first and second events.

57. The method of claim 54 including:

either (1) receiving the first interactive event on a first television channel and the second interactive event on a second television channel or (2) receiving the first and second interactive events on the same channel.

58. The method of claim 54 including:

receiving the interactive data such that the interactive data does not interfere with the presentation of the first or second event on a television monitor.

59. A method for receiving an interactive presentation comprising the steps of:

receiving interactive data which includes commands and event specific data as needed throughout a first event having one or more aspects which make up the first event, in accordance with specific requirements of any particular aspect of the first event and as needed immediately before or during the presentation of said any particular aspect, such that a a participant need not be tuned to the first event from the beginning of the first event in order to participate in said any particular aspect;

storing the event specific data; and acting responsive to the commands in order to use the event specific data stored by the storing means to allow the participant to interact with said any particular aspect of the first event of the presentation.

60. The system of claim 1 wherein:

said receiving means receives interactive data such that the interactive data does not interfere with the presentation of the first or second event on a television monitor.

* * * * *